US007269096B2

(12) United States Patent
Millikin

(10) Patent No.: US 7,269,096 B2
(45) Date of Patent: Sep. 11, 2007

(54) IDENTIFICATION AND LOCATION OF AN OBJECT VIA PASSIVE ACOUSTIC DETECTION

(75) Inventor: Rhonda L. Millikin, Nepean (CA)

(73) Assignee: Her Majesty the Queen in Right of Canada as represented by the Minister of National Defense, Ottawa, Ontario (CA)

( * ) Notice: Subject to any disclaimer, the term of this patent is extended or adjusted under 35 U.S.C. 154(b) by 302 days.

(21) Appl. No.: 10/502,493

(22) PCT Filed: Feb. 24, 2003

(86) PCT No.: PCT/CA03/00250

§ 371 (c)(1), (2), (4) Date: Jan. 10, 2005

(87) PCT Pub. No.: WO03/067281

PCT Pub. Date: Aug. 14, 2003

(65) Prior Publication Data

US 2005/0117454 A1    Jun. 2, 2005

Related U.S. Application Data

(60) Provisional application No. 60/362,590, filed on Feb. 27, 2002.

(51) Int. Cl.
*G01S 5/28* (2006.01)

(52) U.S. Cl. ........................................... 367/127
(58) Field of Classification Search ............... 367/127, 367/125

See application file for complete search history.

(56) References Cited

U.S. PATENT DOCUMENTS 3,466,753 A    9/1969    Prebish et al.

(Continued)

FOREIGN PATENT DOCUMENTS

WO    WO03/067281    *    8/2003

OTHER PUBLICATIONS

Schau et al.; Passive source localization employing intersecting spherical surfaces from time-of-arrival differences; Aug. 1987; Acoustics, Speech, and Signal Processing [see also IEEE Transactions on Signal Processing], IEEE Transactions vol. 35, Issue 8; pp. 1223-1225.*

(Continued)

*Primary Examiner*—Daniel T Pihulic
(74) *Attorney, Agent, or Firm*—Keusey, Tutunjian & Bitetto, P.C.

(57) ABSTRACT

An object producing an acoustic wave is located and identified by passive detection of the acoustic wave. The acoustic wave is defined by different sensors in an array having a plurality of passive acoustic detectors. The sensors produce signals in response to the detection of the acoustic wave. A wavelet derived from an acoustic wave of a known form with which each of the at least three signals correlates, is determined. Time difference of arrival measurements between the at least three signals using correlation intensity with the wavelet is used to performed acoustic reciprocity from each of the different detectors. The result of the acoustic reciprocity is a hemisphere centered around each of the different sensors. The hemispheres produced by the acoustic reciprocity are examiner to determine an intersection point of at least three hemispheres. The size of the hemispheres is increased according to the velocity of the acoustic wave and pre-determined intervals until an intersection point is found. The intersection point represents the location of the object.

33 Claims, 8 Drawing Sheets

U.S. PATENT DOCUMENTS 5,377,163 A    12/1994   Simpson
5,489,909 A     2/1996   Dittmann et al.
6,826,284 B1 * 11/2004   Benesty et al. ............... 381/92

OTHER PUBLICATIONS

D. Garreau "Multiscale Inverse Filtering"; Conference Proceedings; Apr. 3, 1990; pp. 2495-2498; IEEE.

Li Xueyao et al. "Application of the Zero-Crossing Rate, LOFAR Spectrum and Wavelet to the Feature Extraction of Passive Sonar Signal"; Proc. of the 3rd World Congress on Intelligent Control and Automation; Jun. 28-Jul. 2, 2000; pp. 2461-2463; vol. 4; Hefei, P.R. China.

A. Graps "An Introduction to Wavelets" IEEE Computational Science & ENgineering; IEEE Computer Society, US; vol. 2, No. 2, Jun. 21, 1995; pp. 50-61; ISSN: 1070-9924.

* cited by examiner

US 7,269,096 B2

IDENTIFICATION AND LOCATION OF AN OBJECT VIA PASSIVE ACOUSTIC DETECTION

CROSS REFERENCE TO RELATED APPLICATIONS

The present application claims priority from U.S. provisional patent application Ser. No. 60/362,590 filed on Feb. 27, 2002, hereby incorporated by reference.

TECHNICAL FIELD

The present invention relates to the field of identifying and locating sound-emitting objects using acoustic detection.

BACKGROUND ART

Passive identification, location and tracking of sound-emitting objects is generally performed by a system that includes an array of sensors used to detect acoustic waves produced by sound emitted from the object. Signals produced by the array of sensors in response to detection of the acoustic waves are determined in time and space. However, the information contained in these signals depends not only on the object emitting the sound but also on the number of sensors in the array and the geometry of the array.

A typical method for extracting location information from the signals obtained from the array is time difference of arrival (TDOA) whereby the difference between detection time of the acoustic wave at two sensors is exploited to determine the object's location. Successful application of TDOA has been limited to far field applications (i.e. when the object is assumed to be far enough away from the two sensors that acoustic waves can be assumed to be planar), with inaccuracies occurring in near field applications (i.e. distance to the object is less than ten times the distance between the sensors in the array and acoustic waves are spherical). The limited application of TDOA in near field situations has restricted locating sound-emitting objects due to difficulties in separating multiple sound emissions of the same object from multiple tracks of other objects. Identification of objects has been hindered by the high number of repeated measurements needed to characterize individual objects.

SUMMARY OF THE INVENTION

In accordance with one aspect of the present invention there is provided a method of locating an object producing an acoustic wave, the acoustic wave being detected by a plurality of passive acoustic detectors formed in an array to produce at least three signals, the method comprising: (a) determining a wavelet correlatable with each of the at least three signals, said wavelet being derived from an acoustic wave of a known form; (b) determining time difference of arrival (TDOA) measurements between the at least three signals using correlation intensity with said wavelet; (c) performing acoustic reciprocity at a predetermined time interval from each of the plurality of detectors based on said TDOA measurements resulting in a hemisphere centered around each of the plurality of detectors; (d) examining hemispheres produced from step (c) to determine an intersection point of at least three hemispheres; and (e) repeating (c) and (d) with a further time interval to increase the size of said hemispheres if said intersection point is not determined; wherein said intersection point represents a location of the object.

In accordance with another aspect of the present invention there is provided a method of locating an object producing an acoustic wave by passive detection of the acoustic wave, the method comprising: (a) producing at least three signals from detection of the acoustic wave at a plurality of passive acoustic detectors formed in an array; (b) determining a wavelet correlatable with each of the at least three signals correlates, said wavelet being based on an acoustic wave of a known form; (c) determining time difference of arrival (TDOA) measurements between said at least three signals using correlation intensity with said wavelet; (d) performing acoustic reciprocity at time intervals from each of said plurality of detectors based on said TDOA measurements resulting in a hemisphere centered around each of said plurality of detectors; and (e) examining hemispheres produced from step (c) to determine an intersection point of at least three hemispheres at each of said time intervals; wherein said intersection point represents a location of said object.

In accordance with a further aspect of the present invention there is provided a system for locating an object producing an acoustic wave by passive detection of the acoustic wave, wherein at least three signal are produced by detection of the acoustic wave at a plurality of detection points, the system comprising: an object characteristic library containing wavelets derived from acoustic waves of known form; a correlation mechanism for correlating the at least three signals with a wavelet from said object characteristic library; a time difference mechanism for determining time difference of arrival (TDOA) measurements between each of the at least three signals using correlation intensity with said wavelet from said correlation mechanism; an acoustic reciprocity mechanism for performing acoustic reciprocity at time intervals forming hemispheres centered around each of the plurality of detection points based on said TDOA measurements from said time difference mechanism to determine an intersection point of at least three hemispheres; and a controller for coordinating said correlation mechanism, said time difference mechanism and said acoustic reciprocity mechanism; wherein said intersection point represents a location of the object.

In accordance with yet another aspect of the present invention there is provided a computer readable medium having stored thereon computer-executable instructions for locating an object producing an acoustic wave, the acoustic wave being detected by a plurality of passive acoustic detectors formed in an array, the method comprising: (a) determining a wavelet correlatable with each of the at least three signals correlates, said wavelet being derived from an acoustic wave of a known form; (b) determining time difference of arrival (TDOA) measurements between the at least three signals using correlation intensity with said wavelet; (c) performing acoustic reciprocity at a pre-determined time interval from each of the plurality of detectors based on said TDOA measurements resulting in a hemisphere centered around each of the plurality of detectors; (d) examining hemispheres produced from step (c) to determine an intersection point of at least three hemispheres; (e) repeating (c) and (d) with a further time interval to increase the size of said hemisphere if said intersection point is not determined; and wherein said intersection point represents a location of the object.

In accordance with yet a further aspect of the present invention there is provided a system for locating an object in flight producing an acoustic wave by radar detection and by passive detection of the acoustic wave, wherein a radar system detecting the object produces a path for the object and wherein at least three signals are produced by detection of the acoustic wave at a plurality of detection points, the system comprising: an object characteristic library containing wavelets derived from acoustic waves of known form; a correlation mechanism for correlating the at lest three signals with a wavelet from said object characteristic library; a time difference mechanism for determining time difference of arrival (TDOA) measurements between each of the at least three signals using correlation intensity with said wavelet from said correlation mechanism; an acoustic reciprocity mechanism for performing acoustic reciprocity time intervals forming hemispheres centered around each of the plurality of detection points based on said TDOA measurements from said time difference mechanism to determine an intersection point of at least three hemispheres, wherein said intersection point represents a location of the object; a controller for coordinating said correlation mechanism, said time difference mechanism and said acoustic reciprocity mechanism; and a comparator for comparing said location with the path from radar detection to verify said location.

BRIEF DESCRIPTION OF THE DRAWINGS

The present invention will be described in conjunction with the drawings in which.

DETAILED DESCRIPTION OF PREFERRED EMBODIMENTS

Figure 1:
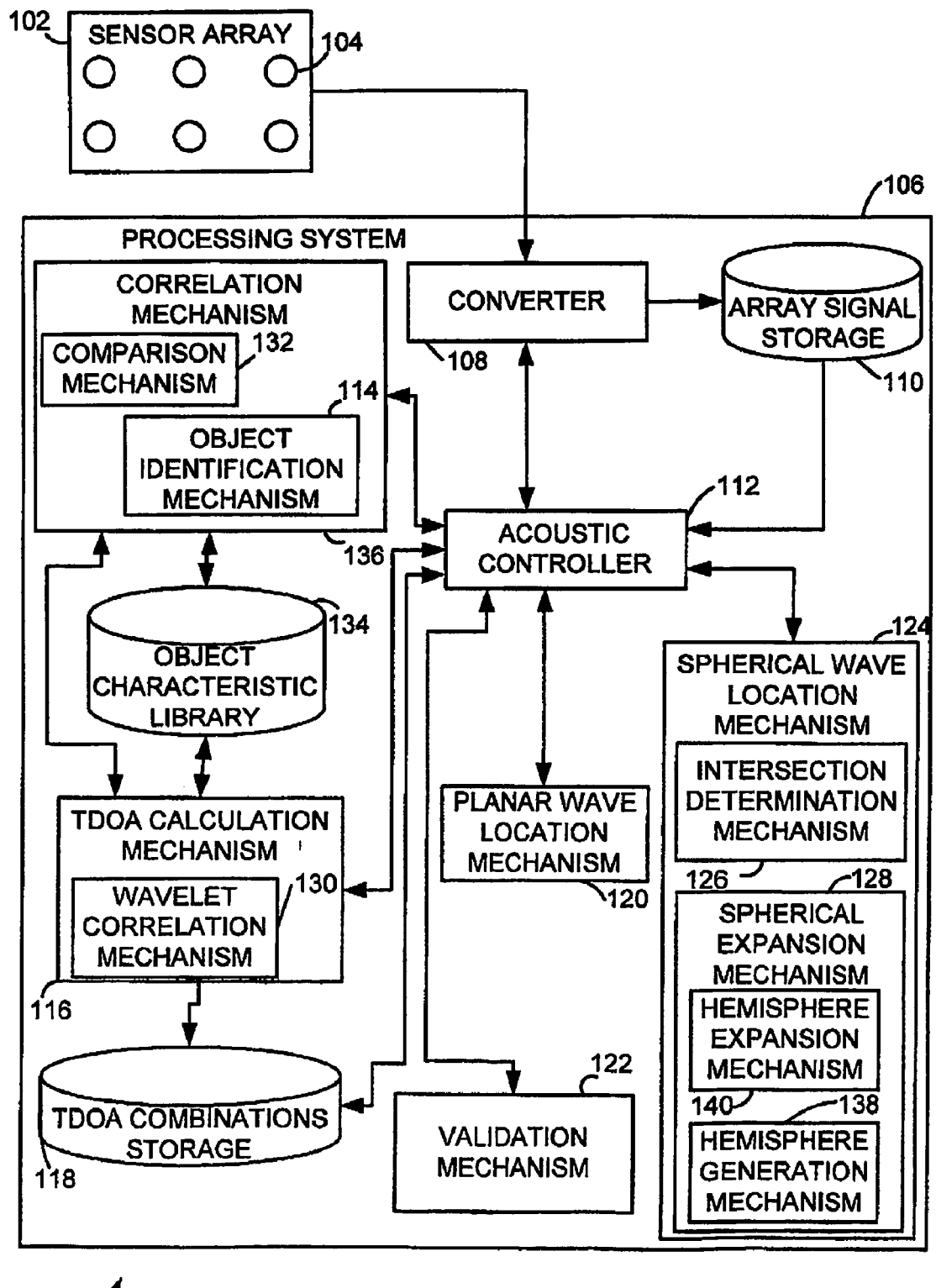
FIG. 1 is a detailed system diagram of an acoustic location system according to an embodiment of the present invention.

FIG. 1 shows an acoustic location system 100 for identifying and locating moving and stationary objects via sound emitted from these objects. The acoustic location system 100 passively monitors a source of acoustic waves, the moving or stationary object, and derives location and identification information for the object from acoustic waves that are received at the acoustic location system 100. The acoustic location system 100 may be configured to identify and locate one or more specific type(s) of target object(s) or all received acoustic waves may be processed to determine the type of object from which the acoustic waves originated and the location of the object.

The acoustic location system 100 is composed of two primary components: a sensor array 102 and a processing system 106. The sensor array 102 includes a plurality of individual acoustic sensors 104 that passively monitor for acoustic waves. Acoustic waves detected by the sensors 104 of the sensor array 102 are provided to the processing system 106 where the time of detection and location of detection of the acoustic waves in the array 102 is used to determine the location of the object. Various characteristics of the acoustic waves such as strength and time-frequency spectrum can be exploited by the processing system 106 to determine the identity of the object given known characteristics for known or target objects. Processing functions of the acoustic location system 100 are performed by the processing system 106.

Figure 2:
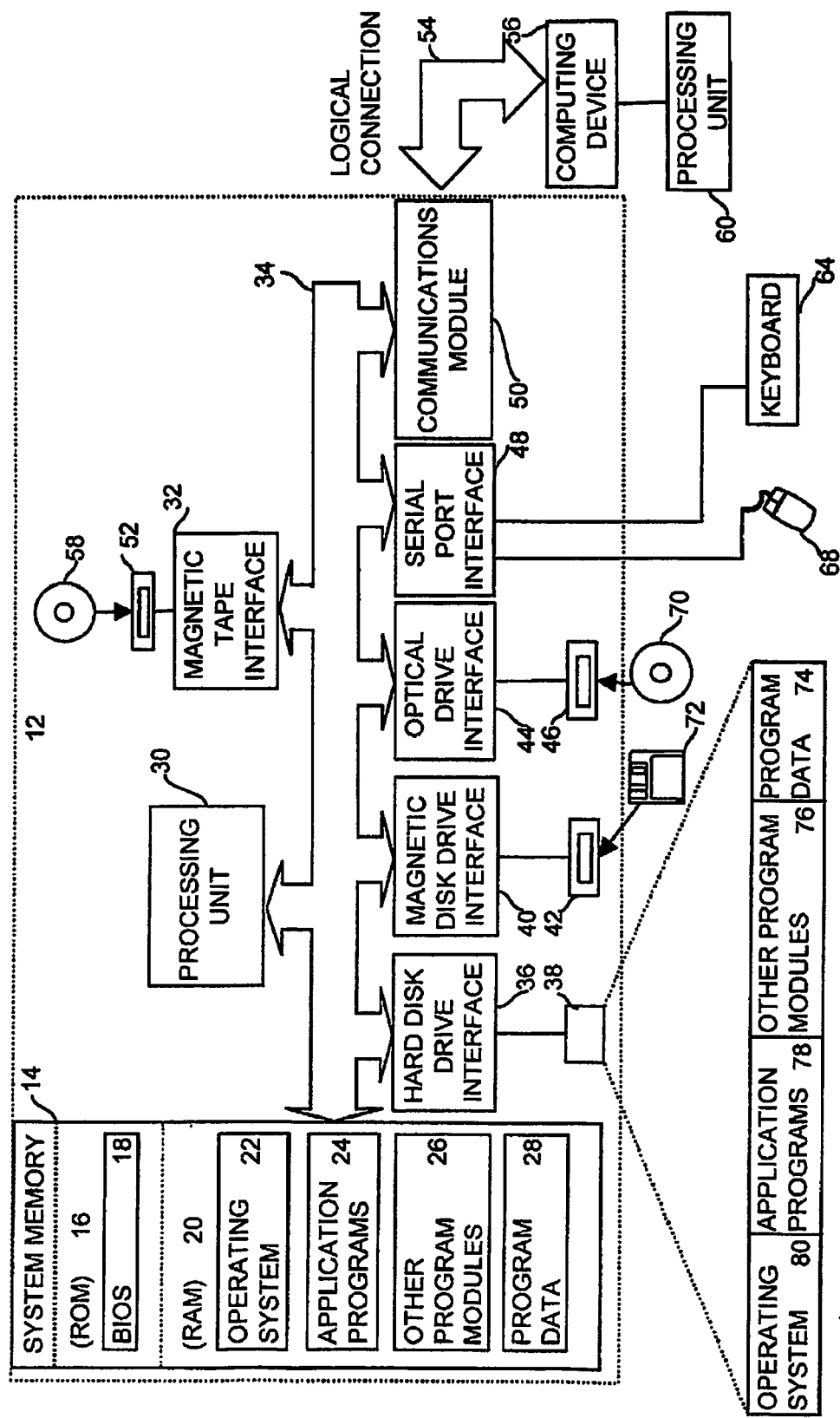
FIG. 2 is an example of a suitable computing environment in which processing functions of the present invention may be implemented.

FIG. 2 and the associated description represent an example of a suitable computing environment 10 in which the processing system 106 of the present invention may be implemented. While the processing system 106 will be described in the general context of computer-executable instructions of a computer program, the processing system 106 can also be implemented in combination with other program modules.

Generally, program modules include routines, programs, components, data structures and the like that perform particular tasks or implement particular abstract data types. Further, the processing system 106 of the present invention can also be implemented using or in combination with other computer system configurations, including hand-held devices, multiprocessor systems, microprocessor-based or programmable consumer electronics, minicomputers, mainframe computers, and distributed computing environments where program modules may be located in both local and remote memory storage devices.

With reference to FIG. 2, the processing system 106 may be implemented within a general purpose computing device in the form of a conventional computer 12, including a processing unit 30, a system memory 14, and a system bus 34 that couples various system components including the system memory 14 to the processing unit 30. The system memory 14 includes read only memory (ROM) 16 and random access memory (RAM) 20.

A basic input/output system 18 (BIOS), containing the basic routines that help to transfer information between elements within the computer 12 (e.g. during start-up) is stored in ROM 16. The computer 12 further includes a hard disk drive 38 for reading from and writing to a hard disk (not shown), a magnetic disk drive 42 for reading from or writing to a removable magnetic disk 72, an optical disk drive 46 for reading from or writing to a removable optical disk 70 such as a CD ROM or other optical media and a magnetic tape drive 52 for reading from or writing to a magnetic tape 58, all of which are connected to the system bus 34 by respective interfaces 36, 40, 44. The drives 38, 42, 46, 32 and their associated computer-readable media 72, 70 provide non-volatile storage of computer readable instructions, data structures, program modules and other data for the computer 12. Although the exemplary environment described herein employs certain disks, it should be appreciated by those skilled in the art that other types of computer readable media for storing data may also be employed.

A number of program modules may be stored on the disks 72, 70, ROM 16 or RAM 20, including an operating system 22, one or more application programs 24, other program modules 76, and program data 74. Commands and information may be entered into the personal computer 12 through input devices (e.g. a keyboard 64, pointing device 68, a microphone, joystick, etc.). These input devices may be connected to the processing unit 30 through a serial port interface 48, a parallel port, game port or a universal serial bus (USB). A monitor 52 or other type of display device may also be connected to the system bus 34 via an interface, such as a video adapter 32.

The computer 12 operates in a networked environment using logical connections to one or more remote computing devices 56, such as another personal computer, a handheld device, a mini computer, microprocessor-based or programmable consumer electronics or any other such device capable of displaying graphics information. The logical connection depicted in FIG. 2 is a communications network 54, which may be a wireless network, a packet-switching network, etc.

The computer 12 is connected to the communications network 54 through a communications module 50. The operations of the processing functions may be distributed between the two computers 12, 56, such that one acts as a server and the other as a client Operations of the processing functions for each computer 12, 56 (client and server) may be stored in RAM 20 of each computer 12, 56 as application programs 24, other program modules 26, or on one of the disks 38, 42, 46. It will be appreciated that the network connections shown are exemplary and other means of establishing a communications link between the computers may be used.

The processing system 106 of the acoustic location system 100 may be employed on the general computing device 12 shown in FIG. 2. The sensor array 102 of the acoustic location system 100 may be in communication with the processing system 106 through the communications module 50 or via the communications network 54.

The sensor array 102, as depicted in FIG. 1, produces a signal that is representative of the acoustic waves received by the individual sensors 104. Each of the sensors 104 may be any acoustic transducer that can passively monitor for acoustic waves, such as a microphone. The type of sensor 104 in the array 102 may be chosen based on the characteristics of the acoustic waves from the type of the target object (i.e. the type of the object that is desired, or expected, to be located or identified). Thus, the transducing capabilities of the sensor array 102 may be varied according to the desired purpose of the system 100.

A direction in three-dimensional space can be defined by two angles (sideways and above), thus setting certain geometric constraints on the array 102. While a triangular sensor array 104 with four sensors is preferable, the system 100 can process signals produced by sensor arrays 102 of non-standard geometries. The processing system 100 can accommodate such variations as sensors 104 at uneven heights, more than four sensors 104 in the array 102 and sensor 104 arrangements not based on equilateral triangles. The geometric configuration of the sensor array 102 may also affect the accuracy of the processing system's 106 determination of the location of the object. For example, a one-dimensional array 102 is symmetric in two dimensions; thus, a one-dimensional array can only define one of the angles on which a location is defined.

Each of the sensors 104 in the array 102 is positioned according to its implementation environment to reduce noise interference and increase received acoustic waves from the type of target object. To improve the processing of the produced signals to obtain information on the target object, sensors 104 are placed in the array 102 to allow reception of acoustic waves by more than one sensor 104. For example, if the type of target object is a bird in flight then the sensors 104 may be arranged to provide overlap between detection regions of individual sensors 104 at heights above the ground where birds are expected to be found.

When an acoustic wave is produced in proximity to the array 102, the configuration of the array 102 is such that multiple sensors 104 will detect the acoustic wave. Due to the time delay produced by the separation of the sensors 104 and the propagation time of the wave, different sensors 104 will detect the wave at different times. The sensor array 102 may have a multiplexor for combining the individual signals produced by detection of the acoustic wave from each sensor 104 in the array 102 to provide a single signal to the processing system 106. The single signal includes information regarding the timing and position of each detected component of the signal. Alternatively, the sensor array 102 may provide separate signals from each of the sensors 104 to the processing system 106. The processing system 106 receives each of these separate signal in such a way as to associate relative timing and position of each of the received signals.

The processing system 106 performs three main functions: storing the signal(s) from the sensor array 102, identifying the object and locating/tracking the object. Signals received by the processing system 106 are adapted for storage in an array signal storage 110 by a converter 108. Signals stored in the array signal storage 110 are processed by a correlation mechanism 136 (through an acoustic controller 112) to determine a form for the acoustic waves detected by the array 102. A location for the object represented by the stored signal may be determined through a combination of time difference of arrival (TDOA) calculations between various sensors 104 in the array 102 that detected the acoustic waves from the object and acoustic reciprocity from those sensors 104.

If the sensors 104 produce analog signals then the signals received directly by the converter 108 are converted into a digital signal by the converter 108 before being stored in the array signal storage 110. The converter 108 may include analog-to-digital signal conversion functions of the type known to those in the art. Alternatively, the sensors 104 may produce digital signals that can be stored directly in the array signal storage 110 (i.e. signals from the sensor array 102 bypass the conversion functions of the converter 108). Receipt of signals from the array 108 are announced to the acoustic controller 112.

The controller 112 manages interactions between the various components of the processing system 106 involved in identifying the type of object and locating the object. The correlation mechanism 136 processes the signals prior to object location processing to determine a form for the signal and a type for the object emitting the acoustic wave. Location of the object is determined through the interaction of a time difference of arrival (TDOA) calculation mechanism 116, a planar wave location mechanism 120 and a spherical wave location mechanism 124.

The correlation mechanism 136 includes a comparison mechanism 132 that functions together with an object characteristic library 134 to provide a form for the acoustic wave and an object identification mechanism 114 that provides an object type for the object from which the acoustic waves were emitted based on the form of the acoustic wave. The controller 112 may request that the correlation mechanism 136 obtain a form of a signal or an identification of the object. If the form of the signal is to be obtained then the comparison mechanism 132 performs the processing. If the identity of the object is to be obtained then the object identification mechanism 114 in conjunction with the comparison mechanism 132 performs the processing. Each signal derived from an acoustic wave has distinguishing features that may be used to describe the signal and may be uniquely associated with the source object of the wave. These distinguishing features may include characteristics of the signal such as the range and value of the frequency spread of the signal, the time length of the signal, the detection range of the sensors 104 detecting the wave, whether the object location is likely to be considered near field or far field and the amount of the Doppler-shift. The distinguishing features of the signal may be correlated with a signal from a known source to identify the object.

Correlation of the stored signal with signals of a known form and possibly from known sources is performed through wavelet analysis. A description in the form of a wavelet for each form or type of object that is anticipated or desired to be detected is stored in the object characteristic library 134. Each wavelet in the object characteristic library 134 is from a signal with a known wave form that may have been obtained from a known object. Every wavelet in the object characteristic library 134 may optionally be classified as being from a known source or having a known form only (i.e. having an unknown source). A wavelet is a time-series signal that is localized in space and limited in frequency. Any arbitrary time-series signal can be decomposed into a sequence of wavelets constructed from a base wavelet and a number of spatially shifted and time-scaled replicas of it. The signals with a known form are used to form other wavelets that are Doppler-shifted (compressed or stretched) version of the original signal. The base wavelet is considered to be a zero Doppler wavelet and the shifted wavelets are shifted from the zero Doppler wavelet in increments at a resolution of interest sufficient to provide shifted wavelets throughout a velocity range of the anticipated type(s) of objects. These shifted wavelets can account for effects that movement has on the signal from the object.

Each wavelet in the object characteristic library 134 may include an identification of the object that emitted the signal on which the wavelet is based, the amount of shift from the original signal if the wavelet has been Doppler-shifted and the corresponding velocity of the object and the height range at which the object is expected to be located. Information associated with each wavelet may be used to narrow the range of possible solutions to only those where the object may realistically be located, and whether the object is likely to be stationary or moving. Wavelet analysis involves forming matched filters from the base signals as well as Doppler-shifted forms of the matched filter.

The comparison mechanism 132 performs a comparison between the stored signal and the wavelets. The stored signal is compared with the wavelets in the object characteristic library 134 using known cross correlation techniques to determine if segments in the stored signal match any of the wavelets in the library 134. The comparison mechanism 132 may optionally examine only those wavelets that have a known form only (unknown source) when the controller 112 specifies obtaining a form for the acoustic wave. The degree to which there is an acceptable correlation between the stored signal and a wavelet may take into consideration variations that naturally occur in the signal. This matching process is performed by the comparison mechanism 132 for each signal from each sensor 104, with the end result being a single wavelet to which each signal corresponds to the acceptable degree. If an acceptable object type match for the stored signal is determined, any additional information associated with the matching wavelet is provided to the controller 112.

When the type of the object from which the acoustic wave originated is to be determined, the object identification mechanism 114 may filter the signal first. If a specific object is desired to be isolated or if there are known sources of noise in the signal then the object identification mechanism 114 filters the stored signals to remove frequencies beyond the range of the specific object. After the initial filtering is performed, the object identification mechanism 114 provides the comparison mechanism 132 with the filtered signal where a match of wavelets may be performed. The comparison with wavelets by the comparison mechanism 132 may be specified to those wavelets that have a known source.

The controller 112 examines the additional information from the correlation mechanism 136 to determine whether the object location is near or far and initiates processing of the stored signal by the appropriate mechanism. When the object satisfies far field conditions the acoustic waves emanating from the object are considered to be planar due to the distance they travel. When the object is in near field conditions the acoustic waves from the object are located so close to the sensors 104 that they have a spherical shape. Due to the difference in the shape of the acoustic wave in far field and near field conditions, different processes may be used for determining the location of the object.

The planar wave location mechanism 120 is provided with the stored signal by the controller 112 for determining a far field location for the object. The planar wave location mechanism 120 determines the location of the object using known time difference of arrival calculations for a planar acoustic wave. The planar wave location mechanism 120 determines the location of the object on the basis of a sensor array configuration in which four sensors 104 positioned in a configuration of equilateral triangles and acoustic wave detection occurring at all four sensors 104. Each sensor 104 in the array 102 will receive the acoustic wave from the object at different times. Based on the time difference between arrival of the acoustic wave at two sensors 104 and the distance between the two of the sensors 104 and the geometry of the sensor array 102, a hyperbolic surface containing possible locations for the object can be produced using known TDOA calculation techniques that exploit geometry. Creation of hyperbolic surfaces from the relative detection times of three pair of sensors 104 provides the location of the object at the point of intersection of the three surfaces.

The TDOA calculation mechanism 116 and the spherical wave location mechanism 124 process the stored signal to determine the location of the object in the case of near field conditions. With a spherical wave the approaching wavefront expands spherically from the source towards the sensor 104 such that the time of arrival of the wave at each sensor 104 defines the radius of the sphere from the object to the sensor 104. To determine the location of the object, spheres are expanded from the sensor 104, according to acoustic reciprocity, based on the speed of sound and the time of arrival of the wave at the sensor 104. The intersection of spheres from the different sensors 104 that detected the wave is the location of the object.

The TDOA calculation mechanism 116 is provided with signals from various sensors 104 in the array 102 stored in the array signal storage 110 and relative times of detection at the sensor 104. The TDOA calculation mechanism 116 determines a difference in the time of arrival of the acoustic waves between various pairs of sensors 104. The time differences between pairs of sensors 104 are stored in a TDOA combinations storage 118.

The TDOA calculation mechanism 116 determines the TDOA between various signals produced by different sensors 104 according to characteristics of the signals. The signal was previously compared against the wavelet in the object characteristic library 134 by the object identification mechanism 114. The controller provides the TDOA calculation mechanism 116 with the identification of the corresponding wavelet. Since the corresponding wavelet is Doppler-shifted the effects of movement of the TDOA determination are accounted for if the same wavelet is used to determine the TDOA between all sensors 104. The TDOA calculation mechanism 116 determines the amount of delay for pairs of stored signals from different sensors 104 based on the delay between the time of peak correlations of a stored signal and the corresponding wavelet in each of the stored signals.

The TDOA as determined by the wavelet analysis is stored in the TDOA combination storage 118. Various TDOA measurements from signals from pairs of sensors 104 are determined in a similar manner and stored in the TDOA combinations storage 118.

The controller 112 has the TDOA measurements filtered by a validation mechanism 122 to remove any measurements that are invalid given characteristics of the sensors 104, expected velocity of the object (as provided in the additional information) and weather patterns at the time of detection. The validation mechanism 122 compares the TDOA measurements with possible ranges in which an acoustic wave could be detected by the sensors 104 from the TDOA measurement. This possible detection range may be predetermined and involves a determination of the detection ranges of the individual sensors 104, the range of their overlap as well as the velocity at which the acoustic wave traveled including various weather effects. Given the TDOA between the sensors 104 and the expected velocity of the object and accounting for delays that temperature and wind would make on the sound, the validation mechanism 122 determines the maximum expected travel time for sound between two of the sensors 104. Any TDOA measurements exceeding the maximum expected travel time are considered to be invalid and are removed from the TDOA combinations storage 118.

After the TDOA measurements have been determined and validated, the controller 112 has the spherical wave location mechanism 124 determine the location of the object. If the object is moving then the corresponding wavelet would be Doppler-shifted from the original wavelet and the additional information supplied by the controller 112 would contain an indication of the amount of the Doppler-shift. The spherical wave location mechanism 124 uses the indication of the Doppler-shift from the additional information in determining the location of the object to account for frequency shifts in the stored signal resulting from the movement. The spherical wave location mechanism 124 uses acoustic reciprocity from the sensors 104 to determine the location of the object. If the time of emission of the acoustic wave from the object was known, hemispheres centered around the sensors 104 of radii adjusted for the time delay of detection at the sensors 104 would intersect at the location of the emitting object. Thus, the spherical wave location mechanism 124 uses an iterative process with the earliest time being the first detection time and iteratively decreases the earliest time until an intersection between the spheres from each sensor 104 is found.

The spherical wave location mechanism 124 includes an intersection determination mechanism 126 and a spherical expansion mechanism 128 that function together to determine the location of the emitting object. The spherical expansion mechanism 128 includes a hemisphere generation mechanism 138 and a hemisphere expansion mechanism 140 that create and expand the hemispheres. The hemisphere generation mechanism 138 starts the spheres centered around the sensors 104 with the first time being the earliest time of detection. Since only one sensor 104 was the earliest to detect the acoustic wave, this sensor 104 would not have a sphere at the first time whereas the other sensors 104 would have a sphere. The radii of the spheres corresponds with the TDOA difference between the sensors 104 and the speed of sound adjusted for weather effects. Since there would not be an intersection between all spheres at the first time, as one sensor 104 does not have a sphere, the spheres are expanded at a predetermined time interval. The hemisphere expansion mechanism 140 expands the hemispheres with a pre-determined time interval using velocity of the acoustic wave taking into consideration weather related variations.

After each expansion the intersection determination mechanism 126 examines the hemispheres from all of the sensors 104 to determine if there is an intersection between all of the hemispheres. The area of the hemispheres searched by the intersection determination mechanism 126 for an intersection point may be restricted such that the only area searched is within the maximum detection region of the sensors 104. Each time the hemispheres are searched and an intersection point between all spheres is not located the intersection determination mechanism 126 notifies the hemisphere expansion mechanism 140 that an intersection was not found. The hemisphere expansion mechanism 140 expands the hemispheres at another predetermined time interval with the new earliest time preceding the previous earliest time and the intersection determination mechanism 126 searches the resulting spheres. This iterative process between the hemisphere expansion mechanism 140 and the intersection determination mechanism 126 continues until an intersection between all hemispheres is located or until the distance from the sensors 104 to the surface of the hemisphere reaches the maximum detection distance of the sensor 104.

Figure 3A:
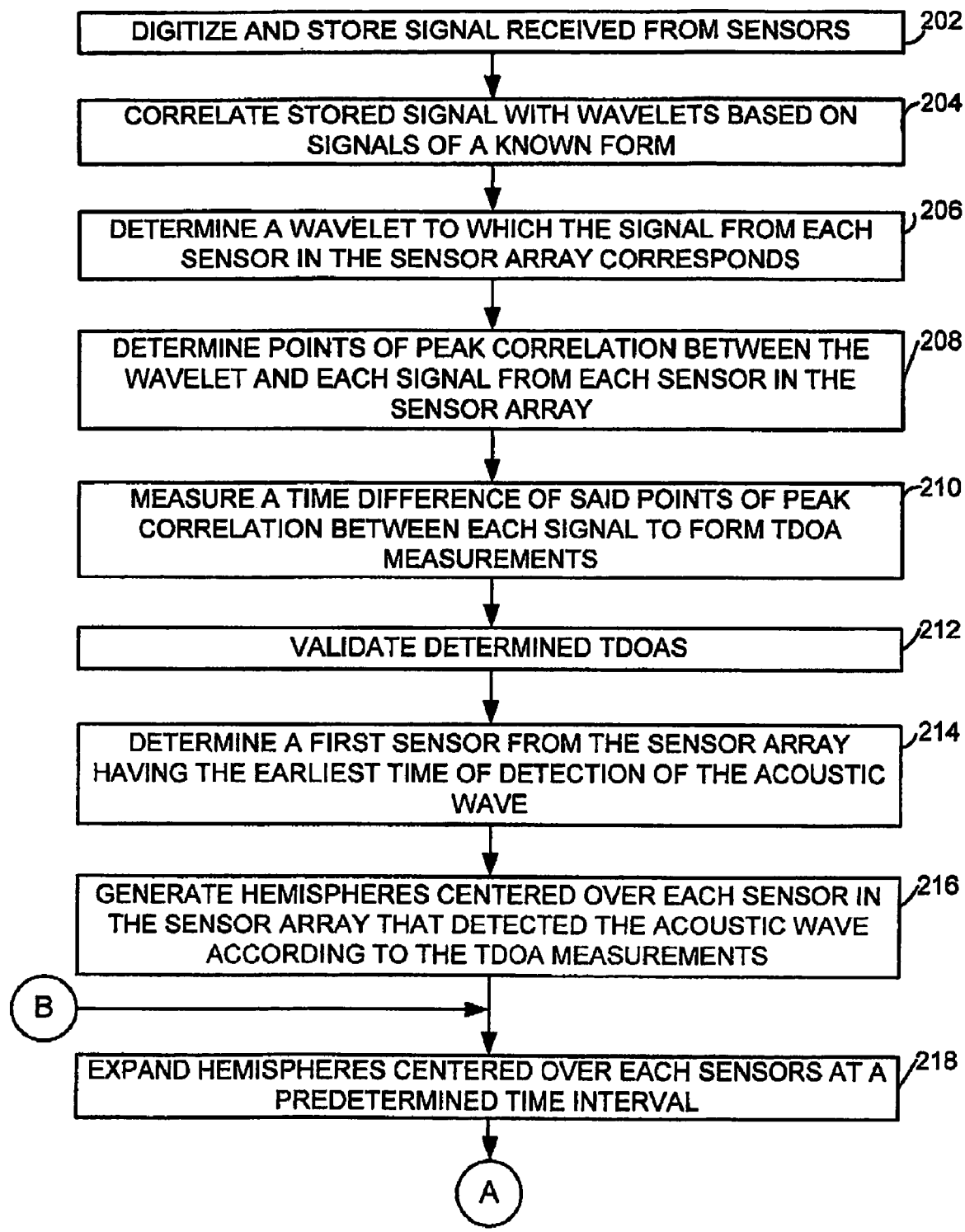
FIGS. 3A and B are a flow chart representing a method of identifying and locating a sound-emitting object according to an embodiment of the present invention.
Figure 3B:
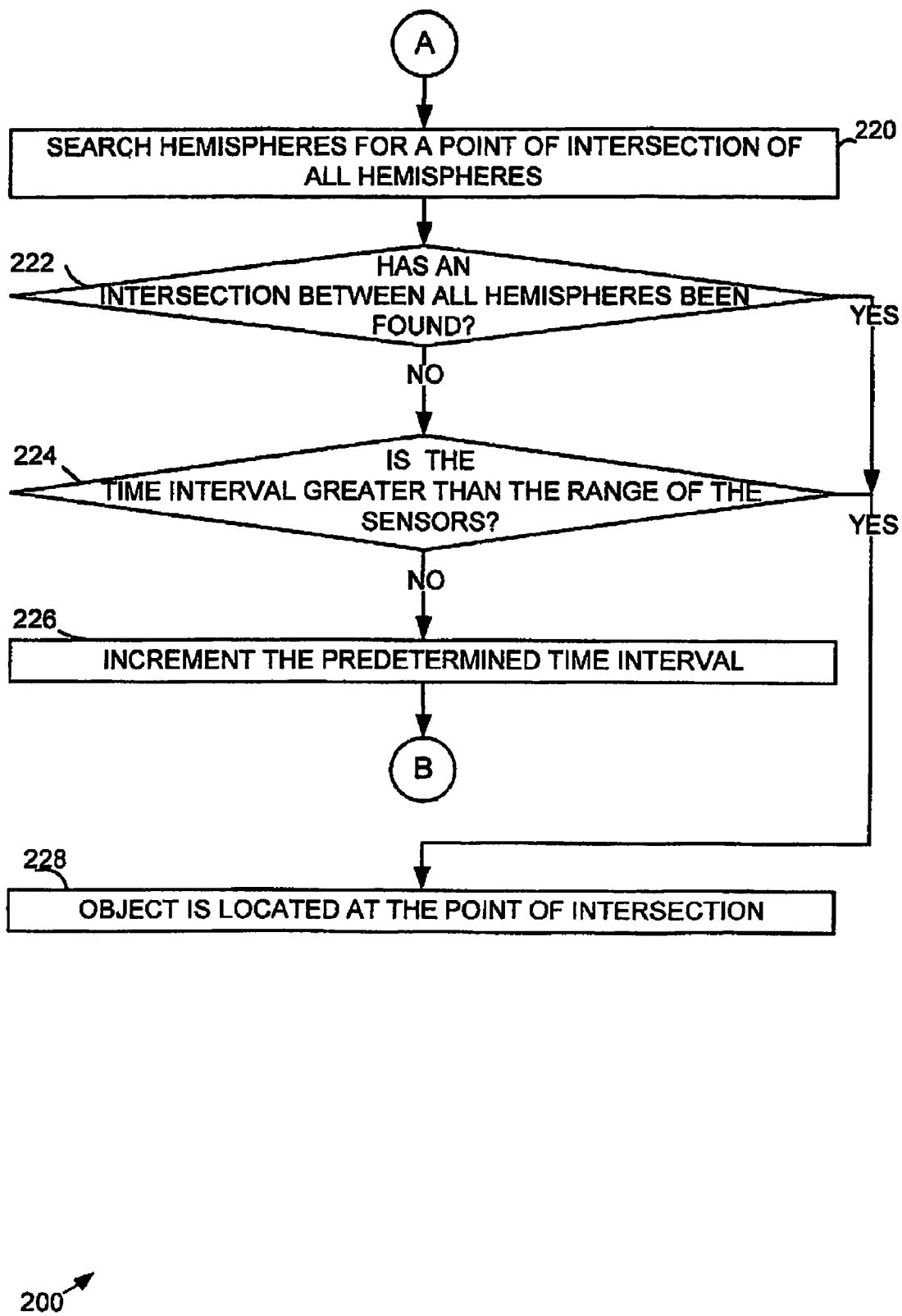

FIGS. 3A and B are a flow chart of a method 200 of identifying and locating a sound-emitting object according to an embodiment of the present invention. The signals from the sensors 104 are digitized and stored in step 202. The stored signal is correlated with the wavelets in the object characteristic library 134 in step 204. A wavelet to which the stored signal from each sensor 104 corresponds to an acceptable degree is determined in step 206. The corresponding wavelet is from a signal of known form. As wavelets are also Doppler-shifted, the corresponding wavelet may also contain information as to the movement of the object.

Points of peak correlation between each signal and the wavelet are determined in step 208. A time difference of these points between the different signals is measured in step 210. These TDOAs are validated in step 212 to ensure that they represent possible locations of the object. Validity of TDOAs may be based on possible detection ranges of the sensors 104 and various weather effects by determining the maximum expected travel time between two sensors 104. Those TDOAs that are not valid are removed.

A first sensor 104 in the array 102 that has the earliest time of detection of the acoustic wave is determined in step 214. The sensor 104 that first detected the acoustic wave from the source object is considered to be at zero time for the initial iteration. Hemispheres centered over each sensor 104 are generated according to the TDOA measurement with the first sensor 104 in step 216. The hemispheres around each sensors 104 are expanded with a predetermined time interval using the velocity of the acoustic wave in step 218. These expanded hemispheres are searched in step 220 looking for a point of intersection of all hemispheres. If this point of intersection has not been found, as determined in step 222, then the time interval is examined in step 224 to determine if it is greater than the possible range of the sensors. If the time interval is greater than the possible range of the sensors then it is assumed that a location for the object cannot be determined from the stored signals. If the time interval has not exceeded the detection range of the sensors then the predetermined time interval is incremented in step 226 and steps 218 to 222 are repeated for a newly expanded set of spheres based on the new predetermined time interval. If an intersection has been found then the location determination process is finished, step 228, and the location of the object is the location of the point of intersection.

Figure 4:
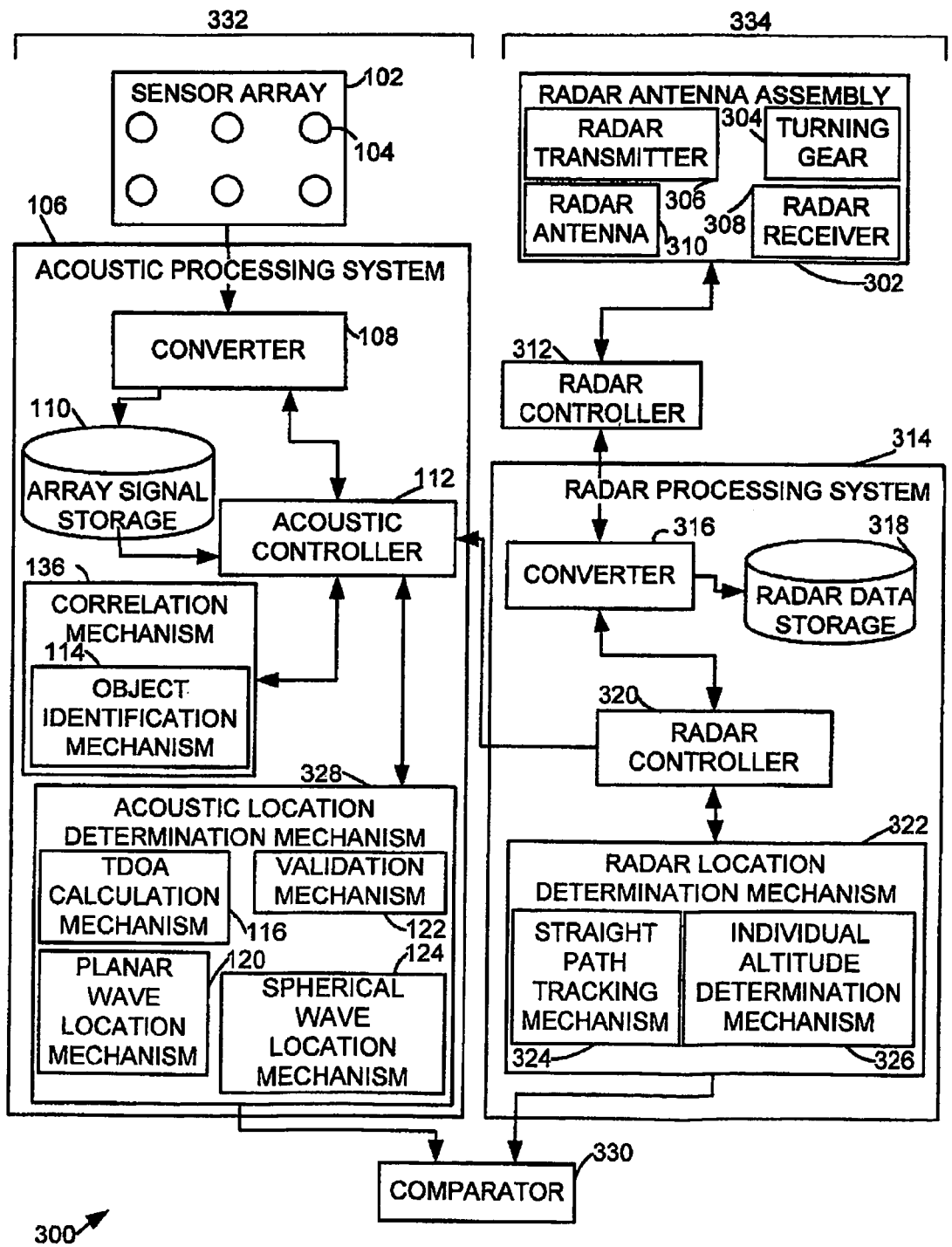
FIG. 4 is a system diagram of a radar guided acoustic system for locating and identifying objects in flight according to an embodiment of the present invention.

A radar guided acoustic system 300 for tracking object in flight according to a second embodiment of the present invention is shown in FIG. 4. The radar guided acoustic system 300 has a radar portion 334 and an acoustic portion 332. The radar portion 334 of the radar guided acoustic system 300 includes a system that can detect and track objects in flight. The radar portion 334 of the system 30 may be the radar system described in PCT/CA02/01031 filed on Jul. 8, 2002 titled "Apparatus and Method of Tracking Objects in Flight," incorporated herein by reference. The radar portion 334 of the radar guided acoustic system 300 may function simultaneously with the acoustic portion 332 or the two may function cooperatively. The use of the two detection methods (radar and acoustic) in conjunction with each other provides a mechanism to confirm object location or detect an object by one method when the other method could not be used (e.g. the object did not provide an acoustic signal while tracked by radar or a radar return while detected acoustically.)

The location of the object produced by the radar portion 334 may be used to assist the acoustic portion 332 in locating and identifying the object as radar has a farther detection range while acoustic detection has a closer detection range. That is, the radar portion 334 may detect the object before it is in range of acoustic detection. However, when the object gets closer to where detection is occurring, radar may fail to detect the object while acoustic detection may be successful. In this mode of operation detection of an object by the radar portion 334 cues the acoustic portion 332 as to location of the object via first and last points on an object track determined by the radar portion 334. The last point in the track may be a projected point that is part of a predicted future path for the object. The acoustic portion 332 then identifies the object and tracks the object through ranges for which the radar portion 334 cannot function.

Alternatively, the radar portion 334 and the acoustic portion 332 may function simultaneously to separately determine the location of the object. The radar guided acoustic system 300 has a comparator 330 that compares the two separately derived locations to determine of they correspond.

The radar portion 334 includes a radar antenna assembly 302 and a radar controller 312 for obtaining radar data and a radar processing system 314 for determining the location of an object based on the radar data. The radar data contains two-dimensional information on the location of the object with respect to the radar antenna assembly 302 and the radar processing system 314 derives three-dimensional location information for the object from the two-dimensional location information.

The radar antenna assembly 300 includes a radar transmitter 306, a radar antenna 310, a radar receiver 308 and a turning gear 304. The radar transmitter 306 transmits pulse sequences through the radar antenna 310 under the control of the radar controller 312. The radar receiver 308 receives radar pulses that are reflected by object in flight back to the radar antenna 310. These received radar pulses indicate a range to the object(s) reflecting the radar pulses to the radar antenna 310 by means such as strength of received radar pulses. The turning gear 304 rotates the radar antenna 310 in a predetermined scan pattern under the control of the radar controller 312. The two-dimensional location of the object is indicated by the range or strength of the received pulse and the azimuth location of the radar antenna 310 at the time when the reflected pulse was received.

The radar controller 312 oversees the process of transmitting and receiving radar pulses, including positioning and controlling movement of the radar antenna 310 via the turning gear 304, the transmission frequency and wavelength, radar pulse length and radar pulse sequencing, and a center frequency for radar pulse detection scanning. The radar controller 312 obtains the received radar signal in an analog form and provides it to the radar processing system 314.

The radar processing system 314 derives a three-dimensional location for the object from the two-dimensional position information obtained from the radar signal. A converter 316 obtains the analog radar signal from the radar controller 312 and digitizes the signal for storage in a radar data storage 318.

A radar controller 320 orchestrates processing of the radar signal to obtain the three-dimensional location. The radar signal is provided to a radar location determination mechanism 322 in the radar processing system 314 for determination of the three-dimensional location of the object. The radar location determination mechanism 322 contains a straight path tracking mechanism 324 and an individual altitude determination mechanism 326. While both the straight path tracking mechanism 324 and the individual altitude determination mechanism 326 estimate the third dimension (elevation angle) of the location of the object, the different mechanisms 324, 326 are used according to the shape of the resulting path of the object.

The radar location determination mechanism 322 processes the radar signal to locate points of detection of the object at different times. These different points of detection are isolated to form a track for the object.

The straight path tracking mechanism 324 performs initial processing of all the points of detection in the track assuming that the track is straight. The straight path tracking mechanism 324 performs neutral regression on the track to determine the altitude of the track. The entire track is processed as a group of points of detection based on the assumption that all points of detection are at the same altitude and that the altitude of the object does not change within the distance tracked. The straight path tracking mechanism 324 assesses the curvature of the track at various possible elevation angles taken at a predetermined interval within a predetermined range of angles. Assessment of the curvature of the track may be based on any known technique for assessing track curvature. The track with the most desirable, possibly least, curvature from the tracks produced by these estimated elevation angles is selected and another series of tracks having elevation angles with a higher precision in a predetermined range of the elevation angle corresponding to the most desirable track is produced. The new series of tracks is similarly assessed for most desirable curvature. If the new desirable track can be considered straight then a track has been produced by the radar processing system and is provided to the acoustic portion 332 with the time of radar detection or to the comparator 330.

If the new desirable track cannot be considered straight then the individual altitude determination mechanism 326 determines the third-dimension location for each point of detection. The individual altitude determination mechanism 326 considers each point of detection in the track and determines the altitude for each point based on azimuth bin estimation. The track with the third dimension is then provided to the acoustic portion 332 with the time of radar detection or to the comparator 330.

The acoustic portion 332 functions in a manner similar to the system 100 in FIG. 1. The sensor array 102 contains multiple sensors 104 that passively monitor for acoustic waves emitted from objects in flight. Signals produced by detection of these acoustic waves are provided to the acoustic processing system 106 where the identity of the object and the location of the object.

The acoustic processing system 106 contains the converter 108 that receives the signals and converts them to a digital format if they are in analog format and stores them in the array signal storage 110. The acoustic processing system 106 contains the acoustic controller 112 that orchestrates the process of identifying and locating the object.

The stored signals are provided to the correlation mechanism 136 with the object identification mechanism 114 where wavelet analysis is performed to determine a wavelet to which all signals correspond. The corresponding wavelet comes from a known source which is used as the identifier of the source of the stored signals. An acoustic location determination mechanism 328 contains the TDOA calculation mechanism 116, the validation mechanism 122, the planar wave location mechanism 120 and the spherical wave location mechanism 124 for determining the location of the object. The TDOA calculation mechanism 116 determines the TDOA between various signals from various pairs of sensors 104 in the array 102. The validation mechanism 122 validates the TDOA measurements from the TDOA calculation mechanism 116 to ensure that they don't violate possible ranges of detection of the sensors 104. The planar wave location mechanism 120 determines the location of the object via a geometric calculation if it is determined that the object is located in a far field situation. The spherical wave location mechanism 124 determines the location of the object via acoustic reciprocity if it is determined that the object is located in a near field situation. After the location of the object has been determined by the acoustic location determination mechanism 328, the location is provided to the comparator 330 for comparison with the radar derived object location.

The comparator 330 determines if the acoustic derived location and the radar derived location are within a predetermined range of each other. If the two location are within this range then there is confirmation as to the location of the object. If the two location are not within this range then this may mean that the target did not provide an acoustic signal while tracked by radar or a radar return while detected acoustically.

Figure 5A:
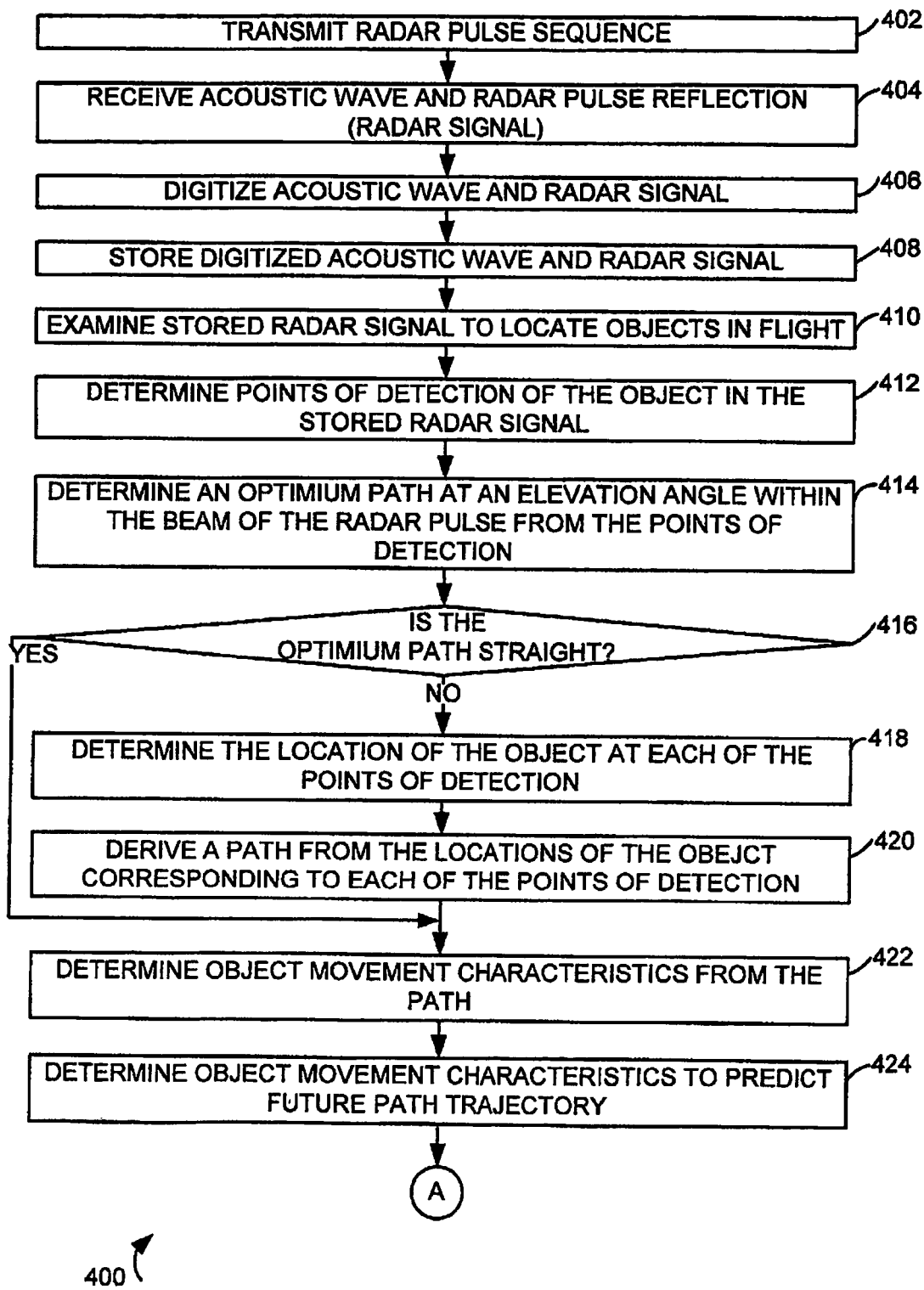
FIGS. 5A, B and C are a flow chart representing a method of locating and identifying objects in flight.
Figure 5B:
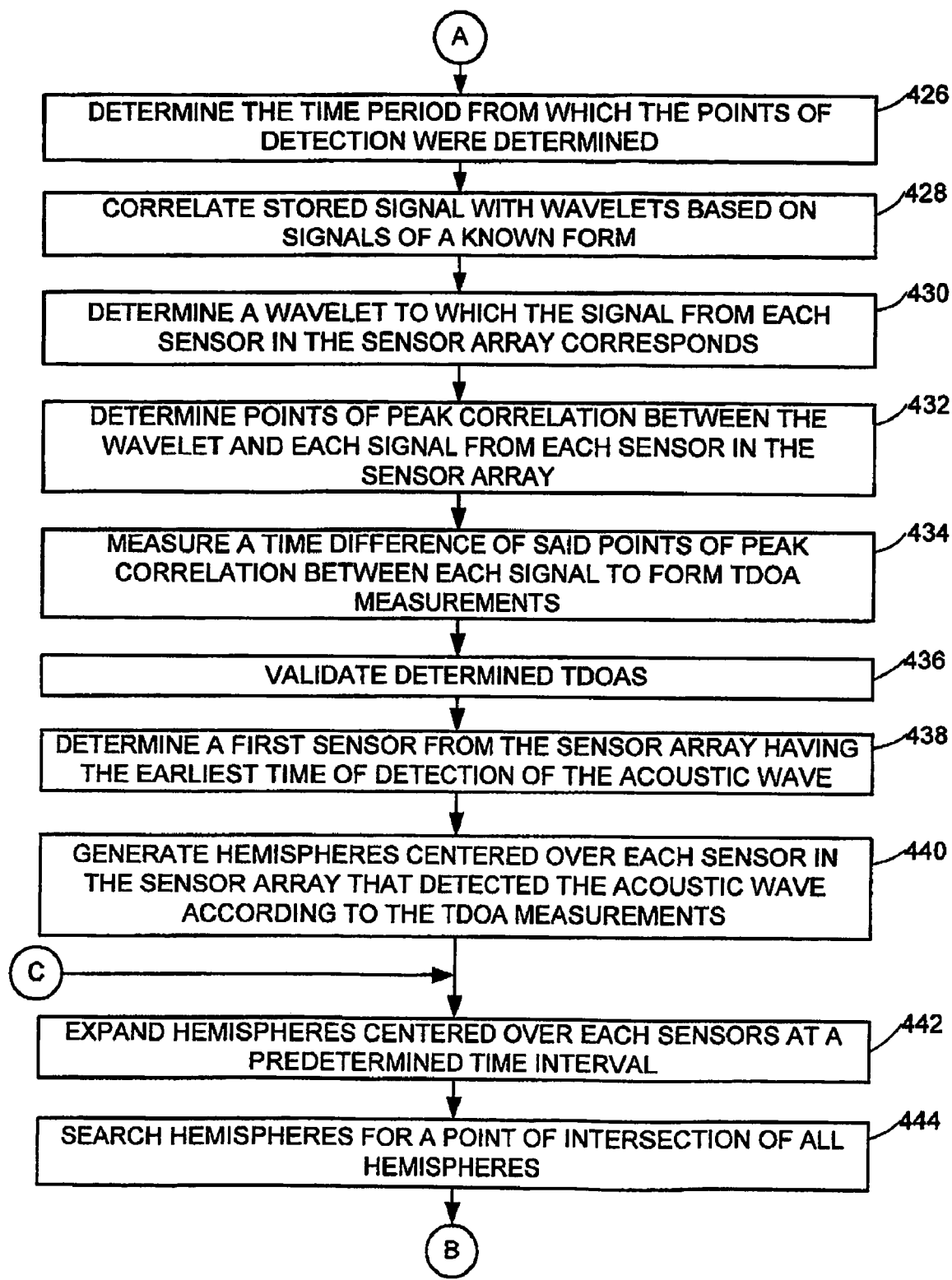
Figure 5C:
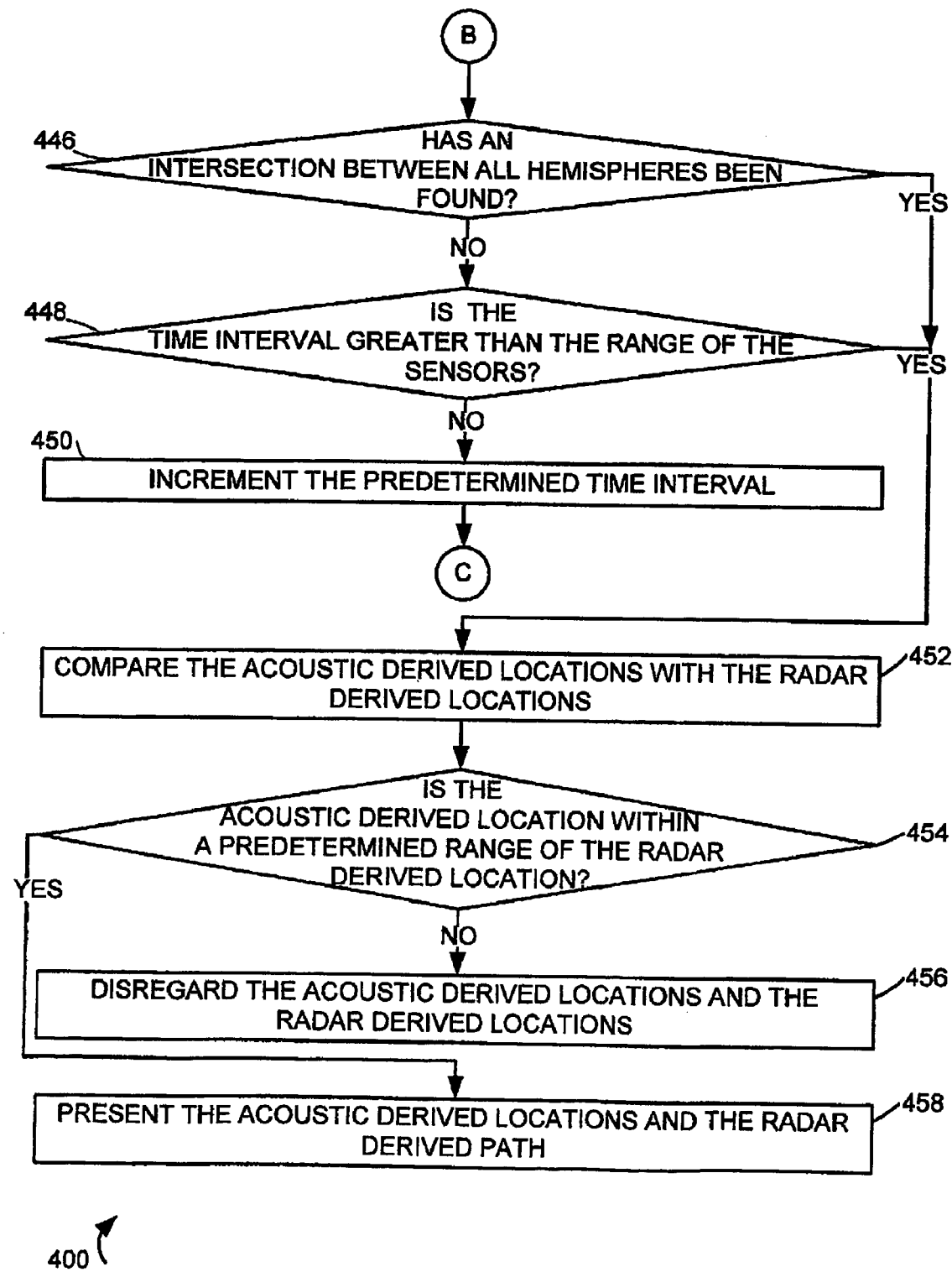

FIGS. 5A to C represent a flow chart of a method 400 of identifying and locating an object in flight using radar and acoustic detection according to an embodiment of the present invention. A radar pulse sequence is transmitted in step 402 and its reflection is received in step 404 along with an acoustic wave. The acoustic wave and radar signal are digitized in step 406 and stored in step 408.

The radar signal is examined in step 410 to locate object in flight. Points of detection of the object in the stored radar signal are determined and isolated instep 412. An optimum path at an elevation angle within the beam of the radar pulse is determined in step 414 based on the points of detection. If the optimum path is not straight as determined in step 416 then the location of the object in three-dimensions at each of the points of detection is determined in step 418. A path from each of these individual locations is derived in step 420.

If the optimum path is straight as determined in step 416 then object movement characteristics are determined from the path in step 422 and the future path trajectory is predicted based on the object movement characteristics in step 424.

In step 426 the time period from which the points of detections were determined is derived. The stored signal is correlated with the wavelets in the object characteristic library 134 in step 428. A wavelet to which the stored signal from each sensor 104 corresponds to an acceptable degree is determined in step 430. The corresponding wavelet is from a signal of a known form. As wavelets are also Doppler-shifted, the corresponding wavelet may also contain information as to the movement of the object.

Points of peak correlation between each signal and the wavelet are determined in step 432. A time difference of these points between the different signals is measured in step 434 to form the TDOAs. These TDOAs are validated in step 436 to ensure that they represent possible locations of the object. Validity of TDOAs may be based on possible detection ranges of the sensors 104 and various weather effects by determining the maximum expected travel time between two sensors 104. Those TDOAs that are not valid are removed from storage.

A first sensor 104 in the array 102 that has the earliest time of detection of the acoustic wave is determined in step 438. The sensor 104 that first detected the acoustic wave from the source object is considered to be at zero time for the initial iteration. Hemispheres centered over each sensor 104 are generated according to the TDOA measurement with the first sensor 104 in step 440. The hemispheres around each sensors 104 are expanded with a predetermined time interval using the velocity of the acoustic wave in step 442. These expanded hemispheres are searched in step 444 looking for a point of intersection of all hemispheres. If this point of intersection has not been found, as determined in step 446, then the time interval is examined in step 448 to determine if it is greater than the possible range of the sensors. If the time interval is greater than the possible range of the sensors then it is assumed that a location for the object cannot be determined from the stored signals. If the time interval has not exceeded the detection range of the sensors then the predetermined time interval is incremented in step 450 and steps 442 to 446 are repeated for a newly expanded set of spheres based on the new predetermined time interval.

The acoustic derived location and the radar derived location are compared in step 452. If the acoustic derived location is not within a predetermined range of the radar derived location, as determined in step 454, then the acoustic derived location and radar derived location may be disregarded 456. If the acoustic derived location is within a predetermined range of the radar derived location then the two location are presented in step 458.

It is apparent to one skilled in the art that numerous modifications and departures from the specific embodiments described herein may be made without departing from the spirit and scope of the invention.

INDUSTRIAL APPLICABILITY

The present invention relates to the industrial field of identifying and locating via passive acoustic detection.

The invention claimed is:

1. A method of locating an object producing an acoustic wave, the acoustic wave being detected by a plurality of passive acoustic detectors formed in an array to produce at least three signals, the method comprising:
(a) determining a wavelet that correlates with each of the at least three signals, said wavelet being derived from an acoustic wave of a known form;
(b) determining time difference of arrival (TDOA) measurements between the at least three signals using correlation intensity with said wavelet;
(c) performing acoustic reciprocity at a pre-determined time interval from each of the plurality of detectors based on said TDOA measurements resulting in a hemisphere centered around each of the plurality of detectors;
(d) examining hemispheres produced from step (c) to determine an intersection point of at least three hemispheres; and
(e) repeating (c) and (d) with a further time interval to increase the size of said hemispheres if said intersection point is not determined;
wherein said intersection point represents a location of the object.

2. The method according to claim 1 wherein said acoustic wave of a known form from which said wavelet is derived is produced by a known object and wherein said known object provides an identity for the object from which the at least three signals are obtained.

3. The method according to claim 1 wherein step (b) includes:
determining points of peak correlation between said wavelet and each of the at least three signals; and
measuring a time difference of said points of peak correlation between the at least three signals to form said TDOA measurements.

4. The method according to claim 2 wherein step (b) includes:
determining if each of said TDOA measurements meets validity criteria based on a time difference of acoustic wave detection between each of the plurality of detectors and possible speeds at which the object may be moving given said identity; and
storing TDOA measurements that meet said validity criteria.

5. The method according to claim 1 wherein step (c) includes:
generating a location hemisphere for each of the plurality of detectors based on an earliest acoustic wave detection time, said TDOA measurements and the velocity of the acoustic wave; and
expanding each of said location hemispheres using said time interval.

6. The method according to claim 5 wherein the step of generating includes:
determining a first detector from the plurality of detectors having the earliest time of detection of the acoustic wave; and
generating said location hemisphere for each of the plurality of detectors, wherein a start radius for each of said location hemispheres is reflective of said TDOA measurement between each of the plurality of detectors and said first detector; and wherein the step of expanding includes:
expanding said location hemisphere for each of said plurality of detectors with said time interval using the velocity of the acoustic wave.

7. A method of locating an object producing an acoustic wave by passive detection of the acoustic wave, the method comprising:
(a) producing at least three signals from detection of the acoustic wave at a plurality of passive acoustic detectors formed in an array;
(b) determining a wavelet that correlates with each of the at least three signals correlates, said wavelet being based on an acoustic wave of a known form;
(c) determining time difference of arrival (TD GA) measurements between said at least three signals using correlation intensity with said wavelet;
(d) performing acoustic reciprocity at time intervals from each of said plurality of detectors based on said TDOA measurements resulting in a hemisphere centered around each of said plurality of detectors; and
(e) examining hemispheres produced from step (c) to determine an intersection point of at least three hemispheres at each of said time intervals;
wherein said intersection point represents a location of said object.

8. The method according to claim 7 wherein said acoustic wave of a known form from which said wavelet is derived is produced by a known object and wherein said known object provides an identity for the object from which the at least three signals are obtained.

9. The method according to claim 7 wherein step (b) includes:
determining points of peak correlation between said wavelet and each of said at least three signals; and
measuring a time difference of said points of peak correlation between said at least three signals to form said TDOA measurements.

10. The method according to claim 8 wherein step (b) includes:
determining if each of said TDOA measurements meets validity criteria based on a time difference of acoustic wave detection between each of said plurality of detectors and possible speeds at which the object may be moving given said identity; and
storing TDOA measurements that meet said validity criteria.

11. The method according to claim 7 wherein step (c) includes:
generating a location hemisphere for each of said plurality of detectors based on an earliest acoustic wave detection time, said TDOA measurements and the velocity of the acoustic wave; and
expanding each of said location hemispheres using said pre-determined time interval.

12. The method according to claim 11 wherein the step of generating includes:
determining a first detector from said plurality of detectors having the earliest time of detection of the acoustic wave; and
generating said location hemisphere for each of said plurality of detectors, wherein a start radius for each of said location hemispheres is reflective of said TDOA measurement between each of said plurality of detectors and said first detector; and wherein the step of expanding includes:
expanding said location hemisphere for each of said plurality of detectors with said time interval using the velocity of the acoustic wave.

13. The method according to claim 7 wherein said wavelet is a Doppler-shifted version of a wavelet of said acoustic wave of a known form.

14. A system for locating an object producing an acoustic wave by passive detection of the acoustic wave, wherein at least three signal are produced by detection of the acoustic wave at a plurality of detection points, the system comprising:
- an object characteristic library containing wavelets derived from acoustic waves of known form;
- a correlation mechanism for determining a wavelet from said object characteristic library that correlates with at least three signals;
- a time difference mechanism for determining time difference of arrival (TDOA) measurements between each of the at least three signals using correlation intensity with said wavelet from said correlation mechanism;
- an acoustic reciprocity mechanism for performing acoustic reciprocity at time intervals forming hemispheres centered around each of the plurality of detection points based on said TDOA measurements from said time difference mechanism to determine an intersection point of at least three hemispheres; and
- a controller for coordinating said correlation mechanism, said time difference mechanism and said acoustic reciprocity mechanism;
- wherein said intersection point represents a location of the object.

15. The system according to claim 14 further including:
- a detection array having a plurality of passive acoustic detectors, each producing a signal on detection of the acoustic wave, wherein the plurality of detectors corresponds with the plurality of detection points.

16. The system according to claim 15 wherein said acoustic wave of a known form from which said wavelet is derived is produced by a known object and wherein said correlation mechanism includes:
- an object identification mechanism for providing an identity for said object from which the at least three signals are obtained based on said wavelet.

17. The system according to claim 14 where said time different mechanism includes:
- a peak correlation mechanism for determining points of peak correlation between said wavelet and each of the at lest three signals and measuring the time difference of said points between the at least three signals to form said TDOA measurements.

18. The system according to claim 16 wherein said system further includes: a validation mechanism for determining if each of said TDOA measurements meets validity criteria based on a time difference of acoustic wave detection between each of said plurality of detectors and possible speeds at which the object may be moving given said identity; and
- a TDOA combinations storage for holding valid TDOA measurements.

19. The system according to claim 15 wherein said acoustic reciprocity mechanism includes:
- a sphere generation mechanism for determining a first detector from said plurality of detectors having the earliest time of detection of the wave and generating a location hemisphere for each of said plurality of detectors, wherein a start radius for each of said location hemispheres is reflective of said TDOA measurement between each of said plurality of detectors and said first detector;
- a sphere expansion mechanism for expanding said location hemispheres for each of said plurality of detectors with said time interval using the velocity of the acoustic wave; and
- a sphere intersection mechanism for examining said location hemispheres to determine an intersection point of at least three of said location hemispheres.

20. A computer readable medium having stored thereon computer-executable instructions for locating an object producing an acoustic wave, the acoustic wave being detected by a plurality of passive acoustic detectors formed in an array, the computer-executable instructions comprising:
- (a) determining a wavelet correlates with each of the at least three signals correlates, said wavelet being derived from an acoustic wave of a known form;
- (b) determining time difference of arrival (TDOA) measurements between the at least three signals using correlation intensity with said wavelet;
- (c) performing acoustic reciprocity at a pre-determined time interval from each of the plurality of detectors based on said TDOA measurements resulting in a hemisphere centered around each of the plurality of detectors;
- (d) examining hemispheres produced from step (c) to determine an intersection point of at least three hemispheres;
- (e) repeating (c) and (d) with a further time interval to increase the size of said hemisphere if said intersection point is not determined; and
- wherein said intersection point represents a location of the object.

21. The computer-executable instructions according to claim 20 wherein said acoustic wave of a known form from which said wavelet is derived is produced by a known object and wherein said known object provides an identity for the object from which the at least three signals are obtained.

22. The computer-executable instructions according to claim 20 wherein step (b) includes:
- determining points of peak correlation between said wavelet and each of the at least three signals; and
- measuring a time difference of said points of peak correlation between the at least three signals to form said TDOA measurements.

23. The computer-executable instructions according to claim 21 wherein step (b) includes:
- determining if each of said TDOA measurements meets validity criteria based on a time difference of acoustic wave detection between each of the different detectors and possible speeds at which the object may be moving given said; and
- storing TDOA measurements that meets said validity criteria.

24. The computer-executable instructions according to claim 20 wherein step (c) includes:
- generating a location hemisphere for each of the plurality of detectors based on an earliest acoustic wave detection time, said TDOA measurements and the velocity of the acoustic wave; and
- expanding each of said location hemispheres using said time interval.

25. The computer-executable instructions according to claim 24 wherein the step of generating includes:
- determining a first detector from the plurality of detectors having the earliest time of detection of the acoustic wave; and
- generating said location hemisphere for each of the plurality of detectors, wherein a start radius for each of said location hemispheres is reflective of said TDOA measurement between each of the plurality of detectors and said first detector; and wherein the step of expanding includes:

expanding said location hemisphere for each of the plurality of detectors with said time interval using the velocity of the acoustic wave.

26. A system for locating an object in flight producing an acoustic wave by radar detection and by passive detection of the acoustic wave, wherein a radar system detecting the object produces a path for the object and wherein at least three signals are produced by detection of the acoustic wave at a plurality of detection points, the system comprising:
   an object characteristic library containing wavelets derived from acoustic waves of known form;
   a correlation mechanism for determining a wavelet from said object characteristic library that correlates with the at least three signals;
   a time difference mechanism for determining time difference of arrival (TDOA) measurements between each of the at least three signals using correlation intensity with said wavelet from said correlation mechanism;
   an acoustic reciprocity mechanism for performing acoustic reciprocity time intervals forming hemispheres centered around each of the plurality of detection points based on said TDOA measurements from said time difference mechanism to determine an intersection point of at least three hemispheres, wherein said intersection point represents a location of the object;
   a controller for coordinating said correlation mechanism, said time difference mechanism and said acoustic reciprocity mechanism; and
   a comparator for comparing said location with the path from radar detection to verify said location.

27. The system according to claim 26 further including:
   a detection array having a plurality of passive acoustic detectors, each producing a signal on detection of the acoustic wave, wherein the plurality of detectors corresponds with the plurality of detection points.

28. The system according to claim 27 wherein said acoustic wave of a known form from which said wavelet is derived is produced by a known object and wherein said correlation mechanism includes:
   an object identification mechanism for providing an identity for said object from which the at least three signals are obtained based on said wavelet.

29. The system according to claim 26 where said time different mechanism includes:
   a peak correlation mechanism for determining points of peak correlation between said wavelet and each of the at lest three signals and measuring the time difference of said points between the at least three signals to form said TDOA measurements.

30. The system according to claim 28 wherein said system further includes:
   a validation mechanism for determining if each of said TDOA measurements meets validity criteria based on a time difference of acoustic wave detection between each of the plurality of detectors and possible speeds at which the object may be moving given said identity; and
   a TDOA combinations storage for holding valid TDOA measurements.

31. The system according to claim 27 wherein said acoustic reciprocity mechanism includes:
   a sphere generation mechanism for determining a first detector from said plurality of detectors having the earliest time of detection of the wave and generating a location hemisphere for each of said plurality of detectors, wherein a start radius for each of said location hemispheres is reflective of said TDOA measurement between each of said plurality of detectors and said first detector;
   a sphere expansion mechanism for expanding said location hemispheres for each of said plurality of detectors with said time interval using the velocity of the acoustic wave; and
   a sphere intersection mechanism for examining said location hemispheres to determine an intersection point of at least three of said location hemispheres.

32. A method of locating an object producing an acoustic wave, the acoustic wave being detected by a plurality of passive acoustic detectors formed in an array to produce at least three signals, the method comprising:
   (a) determining a wavelet that correlates with each of the at least three signals, said wavelet being derived from an acoustic wave of a known form, said acoustic wave being produced by a known object;
   (b) determining time difference of arrival (TDOA) measurements between the at least three signals using correlation intensity with said wavelet;
   (c) performing acoustic reciprocity at a pre-determined time interval from each of the plurality of detectors based on said TDOA measurements resulting in a hemisphere centered around each of the plurality of detectors;
   (d) examining hemispheres produced from step (c) to determine an intersection point of at least three hemispheres; and
   (e) repeating (c) and (d) with a further time interval to increase the size of said hemispheres if said intersection point is not determined;
   wherein said intersection point represents a location of the object, and
   wherein said known object provides an identity for the object from which the at least three signals are obtained.

33. A method of locating an object producing an acoustic wave, the acoustic wave being detected by a plurality of passive acoustic detectors formed in an array to produce at least three signals, the method comprising:
   (a) determining a wavelet that correlates with each of the at least three signals, said wavelet being a Doppler-shifted version of a wavelet of an acoustic wave of a known form;
   (b) determining time difference of arrival (TDOA) measurements between the at least three signals using correlation intensity with said wavelet;
   (c) performing acoustic reciprocity at a pre-determined time interval from each of the plurality of detectors based on said TDOA measurements resulting in a hemisphere centered around each of the plurality of detectors;
   (d) examining hemispheres produced from step (c) to determine an intersection point of at least three hemispheres; and
   (e) repeating (c) and (d) with a further time interval to increase the size of said hemispheres if said intersection point is not determined;
   wherein said intersection point represents a location of the object.

* * * * *